US012791578B2

(12) United States Patent
Severson et al.

(10) Patent No.: US 12,791,578 B2
(45) Date of Patent: Nov. 10, 2026

(54) SYSTEMS AND METHODS FOR DETECTING AN ANGLE OF AN AIRFLOW

(71) Applicant: THE BOEING COMPANY, Arlington, VA (US)

(72) Inventors: Mark Donohue Severson, Coupeville, WA (US); Dejan Nikic, Seattle, WA (US); Michelle Lu Galgana, Burien, WA (US)

(73) Assignee: THE BOEING COMPANY, Arlington, VA (US)

( * ) Notice: Subject to any disclaimer, the term of this patent is extended or adjusted under 35 U.S.C. 154(b) by 257 days.

(21) Appl. No.: 18/673,685

(22) Filed: May 24, 2024

(65) Prior Publication Data

US 2025/0361023 A1 Nov. 27, 2025

(51) Int. Cl.

*G01P 13/02* (2006.01)
*B64D 43/02* (2006.01)
*G01P 5/08* (2006.01)

(52) U.S. Cl.

CPC ............ *G01P 13/025* (2013.01); *B64D 43/02* (2013.01); *G01P 5/08* (2013.01)

(58) Field of Classification Search

CPC .......... G01P 13/025; G01P 5/08; B64D 43/02
See application file for complete search history.

(56) References Cited

U.S. PATENT DOCUMENTS 3,757,808 A 9/1973 Peterson et al.
6,134,485 A * 10/2000 Tanielian ................ G01L 15/00 701/1
6,928,341 B2 * 8/2005 Wise ...................... G01P 13/025 701/6

(Continued)

FOREIGN PATENT DOCUMENTS

DE 102017009995 A1 5/2019
GB 665298 A 1/1952
GB 1591216 A 6/1981

OTHER PUBLICATIONS

Asano, K. et al., "lon-Flow Anemometer Using A High-Voltage Pulse," Journal of Electrostatics, Elsevier Science Publishers B.V. Amsterdam, NL vol. 31, No. Jan. 1, 1994, pp. 91-107.
Extended European Search Report for application No. 25185789.2 dated Dec. 19, 2025, pp. 1-10.
Extended European Search Report for application No. 25169371.9 dated Oct. 1, 2025, pp. 1-9.
Krylov D. L. et al., "Analysis of Errors for Measuring Channels of Aircraft Air Data System with a Fixed Non-Protruding Flow Receiver," Russian Aeronautics (IZ VUZ) Apr. 18, 2018, pp. 481-487.

*Primary Examiner* — Jill E Culler
(74) *Attorney, Agent, or Firm* — Moore IP Law

(57) ABSTRACT

A sensor includes an emitter electrode at a first position and exposed to a fluid airflow. The emitter electrode generates charged particles proximate the emitter electrode. The sensor includes an array of collector electrodes at a second position and exposed to the fluid airflow. Each collector electrode of the array of collector electrodes detects a current associated with an electric field of the charged particles during relative movement of the fluid airflow. The array of collector electrodes includes a first collector electrode aligned with the emitter electrode at a reference position, a first set of collector electrodes angularly offset from the first collector electrode in a first direction, and a second set of collector electrodes angularly offset from the first collector electrode in a second direction. Outputs from the array of collector electrodes indicate an angular direction of the relative movement of the fluid airflow.

20 Claims, 9 Drawing Sheets

(56) References Cited

U.S. PATENT DOCUMENTS

| | | | | |
|---|---|---|---|---|
| 8,256,284 | B2 * | 9/2012 | Vozhdaev ............ | G01K 13/028<br>73/170.02 |
| 9,038,453 | B2 * | 5/2015 | Paris ...................... | G01K 11/00<br>73/170.02 |
| 9,702,892 | B1 | 7/2017 | Richardson | |
| 9,758,257 | B1 | 9/2017 | Frolov et al. | |
| 10,222,452 | B2 | 3/2019 | Bisti et al. | |
| 11,150,262 | B1 | 10/2021 | Sundelin | |
| 11,828,771 | B2 | 11/2023 | Tillotson | |
| 2001/0054311 | A1 | 12/2001 | Hakenesch | |
| 2009/0044634 | A1 | 2/2009 | Weilguny et al. | |
| 2009/0306839 | A1 | 12/2009 | Youngquist et al. | |
| 2011/0219869 | A1 | 9/2011 | Asahara et al. | |
| 2015/0344137 | A1 | 12/2015 | Bartz et al. | |
| 2016/0062363 | A1 | 3/2016 | Fengler | |
| 2017/0267371 | A1 | 9/2017 | Frolov et al. | |
| 2021/0018529 | A1 | 1/2021 | Tillotson | |
| 2021/0147096 | A1 | 5/2021 | Tillotson | |
| 2022/0219833 | A1 | 7/2022 | Severson et al. | |
| 2024/0001375 | A1 | 1/2024 | Henley | |
| 2024/0068454 | A1 | 2/2024 | Ieta et al. | |

* cited by examiner

SYSTEMS AND METHODS FOR DETECTING AN ANGLE OF AN AIRFLOW

FIELD OF THE DISCLOSURE

The subject disclosure is generally related to systems and methods for detecting an angle of an airflow.

BACKGROUND

With ever-increasing air traffic, safety and reliability of aircraft operation becomes correspondingly important. One way aircraft operators ensure safe, reliable operations is through various types of sensors on the aircraft. For example, an angle-of-attack sensor can provide information about the angle at which an aircraft is positioned relative to an oncoming air mass. This data is used for the proper functioning of flight control systems, especially during critical phases of flight such as takeoff, landing, and maneuvers.

Aircraft sensors should be accurate, and redundant sources of accurate information should be available to aircrew. Inaccurate angle of attack readings can lead to confusion for flight crews and potentially dangerous flight situations. Redundant sensors act as a fail-safe mechanism, allowing flight crews to cross-check data from multiple sources and identify discrepancies or failures quickly. This redundancy enhances the overall reliability of the aircraft's systems and increases safety margins, particularly in scenarios where accurate angle of attack information is used to facilitate stable flight.

Furthermore, redundant sensors contribute to the resilience of an aircraft in the face of various environmental factors. Adverse weather conditions, such as icing or turbulence, can affect the performance of sensors, leading to unreliable readings. Having multiple sensors installed ensures that the aircraft can maintain accurate flight data even in challenging conditions. Accordingly, it can be important for redundant sensors to operate in different operating conditions for the aircraft.

SUMMARY

In a particular implementation, an aircraft includes an exterior skin. The aircraft also includes an emitter electrode disposed at a first position in proximity to the exterior skin and exposed to ambient air. The emitter electrode is configured to generate charged particles proximate the emitter electrode. The aircraft also includes an array of collector electrodes disposed at a second position in proximity to the exterior skin and exposed to ambient air, wherein the second position is aft of the first position. Each collector electrode of the array of collector electrodes is configured to detect a current associated with a flow of the charged particles during movement of the aircraft through an atmosphere. The array of collector electrodes includes a first collector electrode aligned with the emitter electrode at a reference position. The array of collector electrodes also includes a first set of collector electrodes angularly offset from the first collector electrode in a first direction. The array of collector electrodes also includes a second set of collector electrodes angularly offset from the first collector electrode in a second direction. Outputs from the array of collector electrodes are indicative of an angle of attack of the aircraft.

In another particular implementation, a sensor includes an emitter electrode configured to be disposed at a first position and exposed to a fluid airflow. The emitter electrode is configured to generate charged particles proximate the emitter electrode. The sensor also includes an array of collector electrodes configured to be disposed at a second position and exposed to the fluid airflow. The second position is offset from the first position. Each collector electrode of the array of collector electrodes is configured to detect a current associated with a flow of the charged particles during movement of the fluid airflow. The array of collector electrodes includes a first collector electrode aligned with the emitter electrode at a reference position. The array of collector electrodes also includes a first set of collector electrodes angularly offset from the first collector electrode in a first direction. The array of collector electrodes also includes a second set of collector electrodes angularly offset from the first collector electrode in a second direction. Outputs from the array of collector electrodes are indicative of an angle direction of the relative movement of the fluid airflow.

In another particular implementation, a method includes emitting charged particles at an emitter electrode disposed at a first position and exposed to ambient air. The method also includes detecting currents at an array of collector electrodes based on a flow of the charged particles. The currents are indicative of an angle of an airflow. The array of collector electrodes is disposed at a second position and exposed to ambient air, wherein the second position is behind the first position relative to the airflow. The array of collector electrodes includes a first collector electrode aligned with the emitter electrode at a reference position. The array of collector electrodes also includes a first set of collector electrodes angularly offset from the first collector electrode in a first direction. The array of collector electrodes also includes a second set of collector electrodes angularly offset from the first collector electrode in a second direction.

DETAILED DESCRIPTION

The systems and methods disclosed herein enable detection of an angle of an airflow by providing a sensor that can be implemented as a solid-state, non-mechanical sensor with no moving parts that can be incorporated into a vehicle flush with a surface (e.g., the vehicle skin) to improve sensor reliability and maintainability. The systems and methods disclosed herein emit charged particles exposed to ambient air and detect currents at an array of collector electrodes based on a flow of the charged particles, where the currents are indicative of an angle of an airflow.

A technical advantage of the subject disclosure is the enablement of efficient and reliable sensor operation. For example, an angle-of-attack sensor implemented using the systems and methods disclosed herein can substantially eliminate known vulnerabilities of mechanical swept-vane, angle-of-attack sensors such as damage and failures due to ground incursions, bird strikes, ice, improper maintenance, etc.

Another technical advantage of the subject disclosure is the enablement of using charged airflow to provide multiple types of air data such as angle of attack, airspeed, static pressure, total air temperature, etc.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 8:
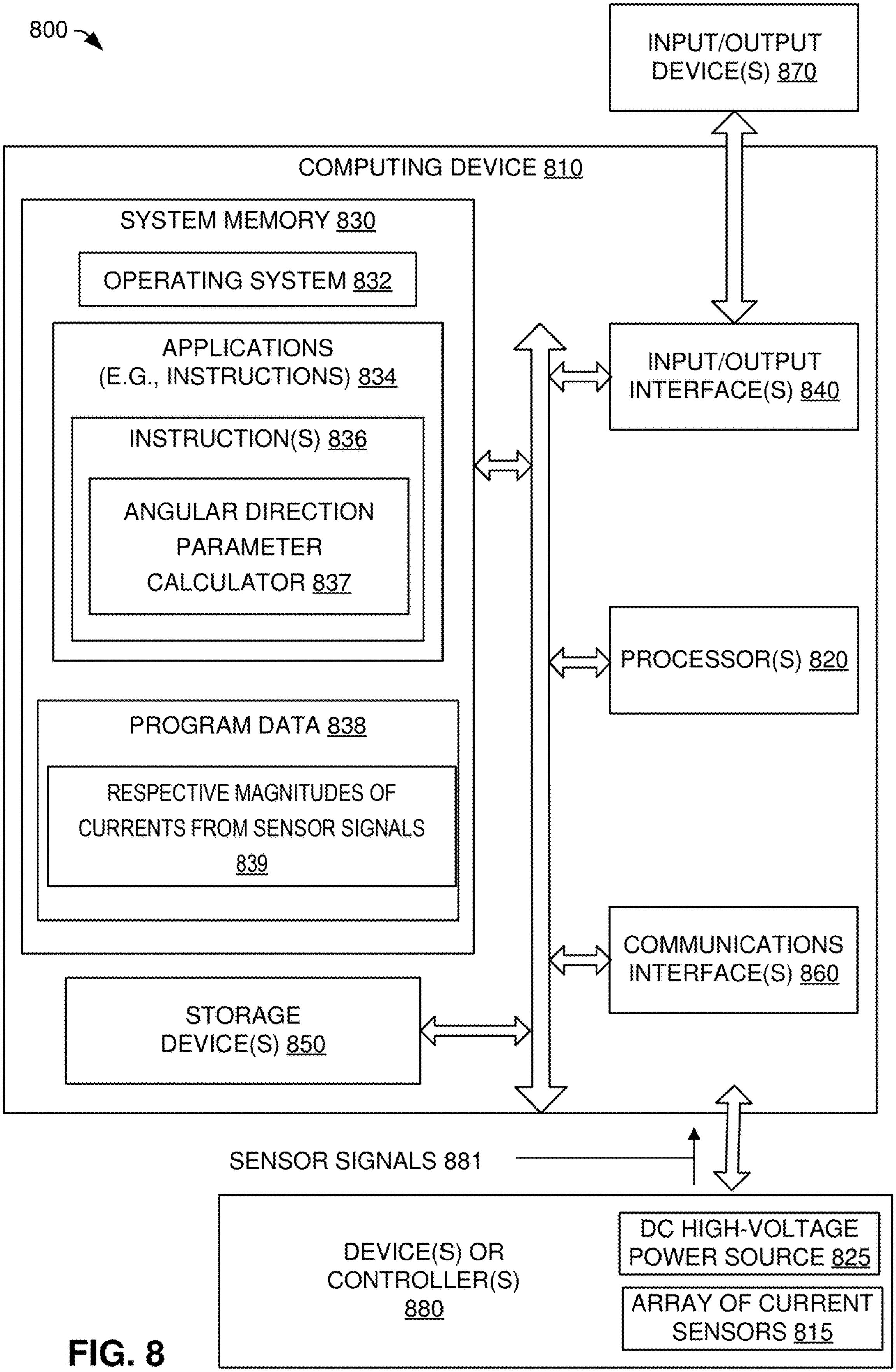
FIG. 8 is a block diagram of a computing environment including a computing device configured to support aspects of computer-implemented methods and computer-executable program instructions (or code), in accordance with some examples of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 8 depicts a computing environment 800 including one or more processors ("processor(s)" 820 in FIG. 8), which indicates that in some implementations the computing environment 800 includes a single processor 820 and in other implementations the computing environment 800 includes multiple processors 820. For ease of reference herein, such features are generally introduced as "one or more" features and are subsequently referred to in the singular or optional plural (as indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
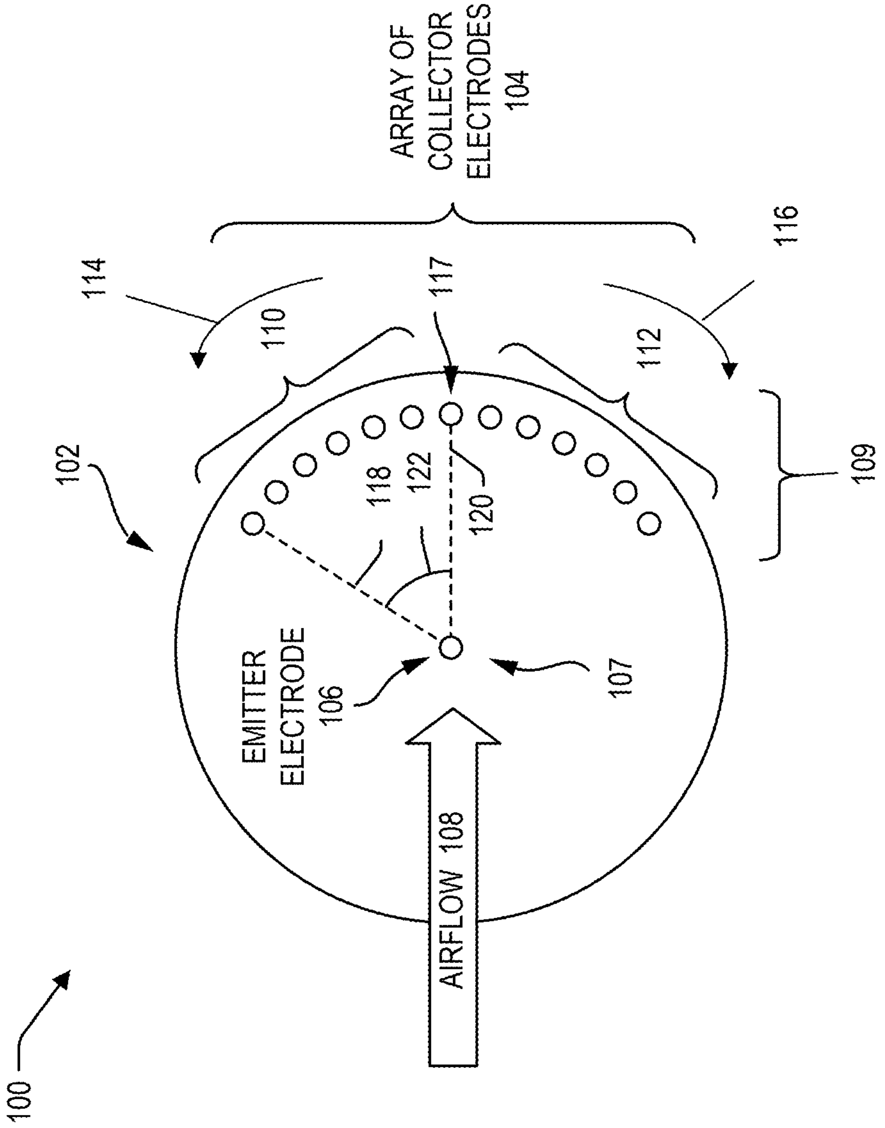
FIG. 1 depicts an example system for detecting an angle of an airflow, in accordance with some examples of the subject disclosure.

FIG. 1 depicts an example system 100 for detecting an angle of an airflow, in accordance with some examples of the subject disclosure. In some implementations, the system 100 includes a sensor 102 that includes an emitter electrode 106 and an array of collector electrodes 104.

In some implementations, the sensor(s) 102 can include, correspond to, or be included within one or more vehicles (e.g., aircraft, unmanned aerial vehicle, etc.), as described below with reference to FIG. 2. In the same or alternative implementations, the sensor(s) 102 can include, correspond to, or be included within one or more other surfaces (e.g., an aircraft model for use in a wind tunnel, a test surface, etc.). In the same or alternative implementations, the sensor is a solid-state angle-of-attack sensor that includes the emitter electrode 106, the array of collector electrodes 104, and a direct-current, high-voltage power source, as described below with reference to FIG. 8.

In some implementations, the emitter electrode 106 is configured to provide an electrical potential between the emitter electrode 106 and the array of collector electrodes 104. The emitter electrode 106 is configured to generate charged particles proximate the emitter electrode 106. For example, the emitter electrode 106 can be configured to generate ions with a positive charge to create a plasma cloud around the emitter electrode 106.

In some implementations, the emitter electrode 106 is disposed at a first position 107 and exposed to a fluid airflow 108. In some aspects, the first position 107 is a position extending above a boundary layer associated with the relative movement of the fluid airflow 108, as described in more detail below with reference to FIG. 3. In the same or alternative aspects, the emitter electrode 106 is shaped to define an apex to concentrate electrical field ionization. For example, the emitter electrode 106 can have a substantially conical shape. In further same or alternative aspects, at least one collector electrode of the array of collector electrodes 104 has a blunted shape. The blunted shape can be configured to increase surface area of the portion of the collector electrode configured to receive charged particles.

In some implementations, the array of collector electrodes 104 is configured to be disposed at a second position 109 and exposed to the fluid airflow 108. The second position 109 can be offset from the first position 107. For example, if the sensor 102 is mounted on an aircraft, the second position 109 can be aft of the first position 107. In some aspects, the second position 109 is sufficiently spaced relative to the first position 107 to substantially prevent arcing between the emitter electrode 106 and the array of collector electrodes 104, as described in more detail below with reference to FIG. 3.

In some implementations, each collector electrode of the array of collector electrodes 104 is configured to detect a current associated with an electric field of the charged particles during relative movement of the fluid airflow 108. For example, if the emitter electrode 106 generates positively charged ions around the emitter electrode 106, relative movement of the fluid airflow 108 will cause a corresponding movement of the ions toward the array of collector electrodes 104. Each collector electrode can be configured to detect a current associated with an electric field of the ions received at the respective collector electrode.

In some aspects, the array of collector electrodes 104 includes a first collector electrode 117 aligned with the emitter electrode 106 at a reference position. For example, the emitter electrode 106 and the first collector electrode 117 can be aligned along an axis 120. The array of collector electrodes 104 can also include a first set 110 of collector electrodes angularly offset from the first collector electrode 117 in a first direction 114.

In a particular aspect, the first set 110 of collector electrodes includes a plurality of electrodes arranged angularly along the first direction 114 and angularly offset from one another across a first range of interest associated with a first angle of the relative movement of the fluid airflow 108. For example, the first set 110 of collector electrodes can include six electrodes as illustrated in the example of FIG. 1. The electrodes of the first set 110 can be arranged angularly along the first direction 114 across the first range of interest. For example, the position of the last offset electrode of the first set 110 can be aligned with the emitter electrode 106 along an axis 118. The angle 122 between the axis 118 and the axis 120 can define the first range of interest. The first range of interest can be associated with a first angle of the relative movement of the fluid airflow 108. For example, for angle of attack measurements, it may only be of interest to calibrate the sensor 102 for a subset of angular measurements. In a particular configuration, the sensor 102 can be implemented to return angle of attack measurements in the range of ±60 degrees relative to the reference position, as described in more detail below with reference to FIG. 4. The first range of interest can be associated with the range of zero to sixty degrees relative to the reference position.

The collector electrodes of the first set 110 can be angularly offset from one another along the first direction 114. In a particular aspect, the collector electrodes are angularly offset from one another at substantially equal angular intervals along the first range of interest. In the same or alternative particular aspects, the electrodes of the first set 110 are positioned equidistant from the emitter electrode 106.

Although FIG. 1 illustrates a particular number of electrodes in the first set 110 of collector electrodes, the first set 110 of collector electrodes can include more or fewer electrodes in the same or alternative configurations. For example, the first set 110 of collector electrodes can include twelve electrodes spaced at approximately five-degree intervals from one another along the first direction 114 and substantially equal angular intervals along the first range of interest including an arc of approximately sixty degrees relative to the first collector electrode 117, as described in more detail below with reference to FIG. 6. As another example, the first range of interest can include an arc of approximately thirty degrees relative to the first collector electrode 117.

In some aspects, the array of collector electrodes 104 can also include a second set 112 of collector electrodes angularly offset from the first collector electrode 117 in a second direction 116. In a particular aspect, the second set 112 of collector electrodes includes a plurality of electrodes arranged angularly along the second direction 116 and angularly offset from one another across a second range of interest associated with a second angle of the relative movement of the fluid airflow 108. For example, the second set 112 of collector electrodes can include six electrodes as illustrated in the example of FIG. 1. The electrodes of the second set 112 can be arranged angularly along the second direction 116 across the second range of interest. The second range of interest can be associated with a second angle of the relative movement of the fluid airflow 108. For example, for angle of attack measurements, it may only be of interest to calibrate the sensor 102 for a subset of angular measurements. In a particular configuration, the sensor 102 can be implemented to return angle of attack measurements in the range of ±60 degrees relative to the reference position, as described in more detail below with reference to FIG. 4. The second range of interest can be associated with the range of zero to negative sixty degrees relative to the reference position.

The collector electrodes of the second set 112 can be angularly offset from one another along the second direction 116. In a particular aspect, the collector electrodes are angularly offset from one another at substantially equal angular intervals along the second range of interest. In the same or alternative particular aspects, the electrodes of the second set 112 are positioned equidistant from the emitter electrode 106.

Although FIG. 1 illustrates a particular number of electrodes in the second set 112 of collector electrodes, the second set 112 of collector electrodes can include more or fewer electrodes in the same or alternative configurations. For example, the second set 112 of collector electrodes can include twelve electrodes spaced at approximately five-degree intervals from one another along the second direction 116 and substantially equal angular intervals along the second range of interest including an arc of approximately sixty degrees relative to the first collector electrode 117, as described in more detail below with reference to FIG. 6. As another example, the first range of interest can include an arc of approximately thirty degrees relative to the first collector electrode 117.

In some implementations, the sensor 102 can also include an array of current sensors, as described below with reference to FIG. 8. Each sensor of the array of current sensors is coupled to a respective collector electrode of the array of collector electrodes 104.

In a particular aspect, each sensor of the array of current sensors is also configured to output a sensor signal. The system 100 can also include one or more processors connected to receive the sensor signals from the array of current sensors and configured to compute an angular direction parameter value based at least in part on a relationship between respective magnitudes of the currents associated with the sensor signals, as described in more detail below with reference to FIGS. 4-5. The direction of the relative movement of the fluid airflow 108 is indicated by the angular direction parameter value. The processors can also be configured to compute the fluid airflow direction parameter value based at least on a current peak at the array of collector electrodes 104, as described in more detail below with reference to FIGS. 4-5.

As an illustrative operation, the relative movement of the fluid airflow 108 can include operation of the sensor 102 in an atmosphere. For example, the sensor 102 can be coupled to a skin of an aircraft moving through the atmosphere. The emitter electrode 106 can be configured to generate a plasma of positively charged ions, which are moved by the relative motion of the fluid airflow 108 toward the array of collector electrodes 104. In a particular configuration of the array of collector electrodes 104, the reference position can include a zero-angle reference position, the first direction 114 can be a positive angle direction and the second direction 116 can be a negative angle direction. As the ions are received at the array of collector electrodes 104, an array of current sensors coupled to the array of collector electrodes 104 can detect the current induced at each collector electrode of the array of collector electrodes 104 and output a plurality of sensor signals. Processor(s) can receive the sensor signals and compute an angular direction parameter value based on a relationship between respective magnitudes of the currents associated with the sensor signals.

The angular direction of the relative movement of the fluid airflow 108 can be based on the angular direction parameter value and include an angular measurement output of the sensor 102. In the particular exemplary configuration described above, the first set 110 of collector electrodes includes a first plurality of electrodes arranged angularly along the first direction 114 and angularly offset from one another across the first range of interest associated with a positive angular measurement output of the sensor 102. The second set 112 of collector electrodes includes a second plurality of electrodes arranged angularly along the second direction 116 and angularly offset from one another across the second range of interest associated with a negative angular measurement output of the sensor 102. For example, the angular direction parameter value can be based in part on respective magnitudes of the currents associated with the sensor signals associated with the first plurality of electrodes for a positive angle portion of the angular direction of the relative movement of the fluid airflow 108, and based in part on respective magnitudes of the currents associated with the sensors signals associated with the second plurality of electrodes for a negative angle portion of the angular direction of the relative movement of the fluid airflow 108.

In a particular configuration, movement of the aircraft through the atmosphere includes a lateral axis motion of the aircraft and a chord line of an airfoil relative to airflow as the airfoil moves through the atmosphere. The lateral movement causes a change of the angle of attack of the aircraft. In such a configuration, the reference position includes a zero-angle reference position, the first direction 114 includes a positive angle direction, and the second direction 116 includes a negative angle direction.

Figure 2:
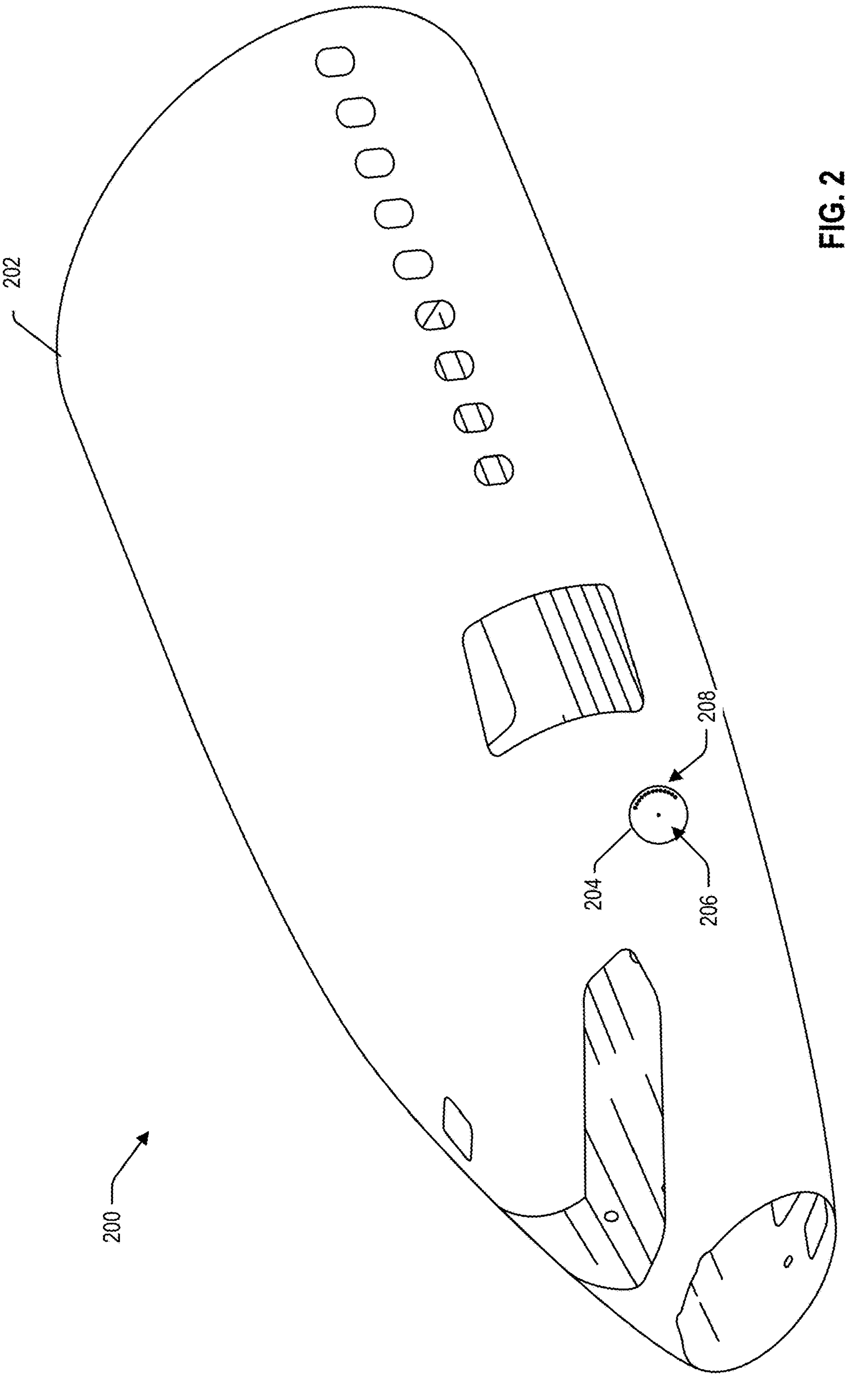
FIG. 2 depicts an example of a portion of an aircraft including a sensor detecting an angle of an airflow, in accordance with some examples of the subject disclosure.

FIG. 2 depicts an example of a portion of an aircraft 200 that includes a sensor for detecting an angle of an airflow, in accordance with some examples of the subject disclosure. In some implementations, the aircraft 200 includes an exterior skin 202 and a sensor 204 coupled to the exterior skin 202. Generally, the sensor 204 corresponds to the sensor 102 of FIG. 1.

In some implementations, the sensor 204 includes an emitter electrode (e.g., the emitter electrode 106 of FIG. 1) disposed at a first position 206 in proximity to the exterior skin 202 and exposed to ambient air. In a particular aspect, the first position 206 is elevated from the exterior skin 202 and extends above a boundary layer associated with the ambient air during movement of the aircraft 200 through the atmosphere. The emitter electrode is configured to generate charged particles proximate the emitter electrode, as described in more detail above with reference to FIG. 1.

The sensor 204 can also include an array of collector electrodes (e.g., the array of collector electrodes 104 of FIG. 1) disposed at a second position 208 in proximity to the exterior skin 202 and exposed to ambient air. The second position 208 can be aft of the first position 206. In some aspects, the second position 208 is sufficiently spaced relative to the first position 206 to substantially prevent arcing between the emitter electrode 106 and the array of collector electrodes 104, as described in more detail below with reference to FIG. 3.

Although FIG. 2 illustrates certain features of the aircraft 200, more, fewer, and/or different components of the aircraft 200 can be present without departing from the scope of the subject disclosure. For example, the aircraft 200 can include an array of current sensors. Each sensor of the array of current sensors is coupled to a respective collector electrode of the array of collector electrodes and configured to output a sensor signal. The aircraft 200 can also include one or more processors connected to receive the sensor signals from the array of current sensors.

Figure 3:
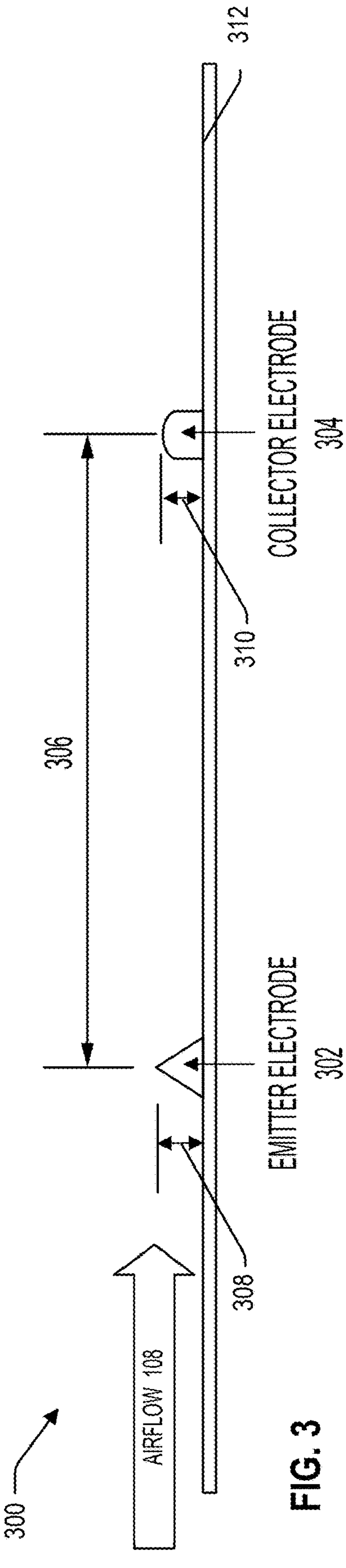
FIG. 3 illustrates an exemplary system including an emitter electrode relative to a collector electrode of an array of collector electrodes, in accordance with some examples of the subject disclosure.

FIG. 3 illustrates an exemplary system 300 including an emitter electrode 302 relative to a collector electrode 304 of an array of collector electrodes, in accordance with some examples of the subject disclosure. Generally, the emitter electrode 302 corresponds to the emitter electrode 106 of FIG. 1 and the collector electrode 304 corresponds to one of the collector electrodes of the array of collector electrodes 104 of FIG. 1.

In some implementations, the emitter electrode 302 is disposed at a first position (e.g., the first position 107 of FIG. 1, the first position 206 of FIG. 2, etc.) and the collector electrode 304 is disposed at a second position (e.g., the second position 109 of FIG. 1, the second position 208 of FIG. 2, etc.). Both the emitter electrode 302 and the collector electrode 304 are exposed to the fluid airflow 108 of FIG. 1. For example, the emitter electrode 302 and the collector electrode 304 can be disposed in proximity to the exterior skin of an aircraft and exposed to ambient air, as described above with reference to FIG. 2. In such a configuration, the second position is aft of the first position.

In some aspects, the second position of the collector electrode 304 is sufficiently spaced relative to the first position of the emitter electrode 302 to substantially prevent arcing between the emitter electrode 302 and the collector electrode 304. For example, the distance 306 between the emitter electrode 302 and the collector electrode 304 can be approximately 30.78 mm. In the same or alternative aspects, the first position, the second position, or both extends above a boundary layer associated with the relative movement of the fluid airflow 108. For example, the distance 308 between the emitter electrode 302 and the surface 312 on which the emitter electrode 302 is disposed can be approximately 2.54 mm. The distance between the respective electrodes and the surface 312 can be the same or different for the emitter electrode 302 and the collector electrode 304. For example, the distance 310 between the collector electrode 304 and the surface 312 on which the collector electrode 304 is disposed can be approximately 1.90 mm. Additionally, the distance 310 can be the same or different for the plurality of collector electrodes 304 in a particular configuration of the array of collector electrodes 104 of FIG. 1.

In some aspects, the first position of the emitter electrode 302 can extend above the boundary layer while remaining close to the edge of the boundary layer. Measuring the propagation of ionized air molecules near the boundary layer of the sensor (e.g., the sensor 102 of FIG. 1) can enable accurate calculation of aircraft angle of attack.

Figure 4:
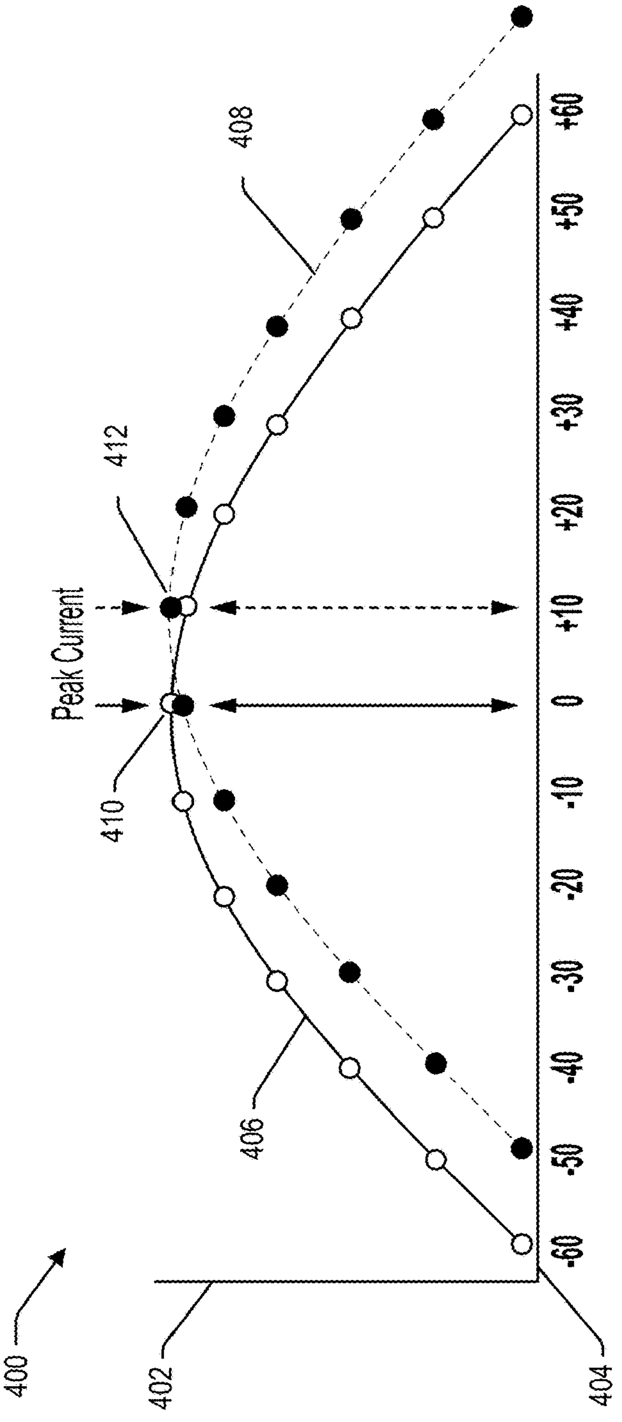
FIG. 4 illustrates an example diagram of a relationship between respective magnitudes of currents associated with sensor signals to generate an angle-of-attack parameter value, in accordance with some examples of the subject disclosure.

FIG. 4 illustrates an example diagram 400 of a relationship between respective magnitudes of currents associated with sensor signals (e.g., the sensor signals of FIG. 1, the sensor signals 881 of FIG. 8, or some combination thereof) to generate an angle-of-attack parameter value, in accordance with some examples of the subject disclosure. In some aspects, the angle of attack of an aircraft (e.g., the aircraft 200 of FIG. 2) is indicated by the angle-of-attack parameter value.

The example diagram 400 illustrates a plurality of data points plotted along a first axis 404 and a second axis 402. In a particular aspect, the first axis 404 includes values associated with an angle of attack of an aircraft, including values reflective of the first and second ranges of interest described in more detail above with reference to FIG. 1. For example, the illustrative diagram 400 includes the first axis 404 including values from negative sixty degrees angle of attack to positive sixty degrees angle of attack. The second axis 402 can include values associated with a current associated with a particular collector electrode of an array of collector electrodes (e.g., the array of collector electrodes 104 of FIG. 1). For example, the second axis 402 can include values of the currents as measured in milliamperes.

In some implementations, the diagram 400 includes a first set 406 of data points and a second set 408 of data points. Each of the sets 406, 408 of data points includes an exemplary thirteen data points, with each data point corresponding to a respective collector electrode of the exemplary array of collector electrodes 104 of FIG. 1. For example, the array of collector electrodes 104 can include the first collector electrode 117, the first set 110 of collector electrodes angularly offset from the first collector electrode 117 in the first direction 114, and the second set 112 of collector electrodes angularly offset from the first collector electrode 117 in the second direction 116. As illustrated in the exemplary sensor 102 of FIG. 1, the first set 110 and the second set 112 each include six collector electrodes spaced equidistant from the emitter electrode 106 and spaced equidistant from one another. In an exemplary configuration, each collector electrode of the array of collector electrodes 104 can correspond to a gradient of a range of interest for an angular direction of relative movement of the fluid airflow 108. Thus, the first collector electrode 117 can be associated with a zero-angle reference position, the first set 110 can be associated with a first range of interest in a positive angle direction, and the second set 112 can be associated with a second range of interest in a negative angle direction.

In the exemplary configuration described above, the first set 110 includes six collector electrodes. Each collector electrode of the first set 110 can be associated with different values within the first range of interest at regular intervals: the collector electrode closest to the first collector electrode 117 of FIG. 1 can be associated with a positive ten-degree angle of the angular direction of the relative movement of the fluid airflow 108. To illustrate, the collector electrode of the first set 110 closest in proximity to the first collector electrode 117 can be associated with a positive ten-degree angular direction, the next collector electrode along the first direction 114 can be associated with a positive twenty-degree angular direction, etc. Likewise, the collector electrode of the second set 112 closest in proximity to the first collector electrode 117 can be associated with a negative ten-degree angular direction, the next collector electrode along the second direction 116 can be associated with a negative twenty-degree angular direction, etc.

In the example diagram 400, the sets 406, 408 each include a data point for each of the exemplary collector electrodes. The value of each data point along the second axis 402 can be associated with a current detected at the respective collector electrode and received from the sensor signal(s), as described in more detail above with reference to FIG. 1. The data points are plotted along the axes 402, 404 to generate a statistical fit to the respective sets of data points. For example, the sets 406, 408 of FIG. 4 illustrate a substantially Gaussian distribution of the data points of the sets 406, 408.

In some implementations, one or more processors can be configured to compute a fluid airflow direction parameter value (e.g., an angle-of-attack parameter value) based at least on a current peak at the array of collector electrodes 104 of FIG. 1. In a particular aspect, the current peak can be identified from the peak of the statistical fit to the data points for a particular data set. For example, the data set 406 illustrates a peak current 410 associated with a zero-degree angle of attack. The data set 408 illustrates a peak current 412 associated with a positive ten-degree angle of attack. By identifying a peak value from a statistical analysis of a data set associated with relative current magnitudes from the array of collector electrodes, the processor(s) can compute the fluid airflow direction parameter value.

Figure 5:
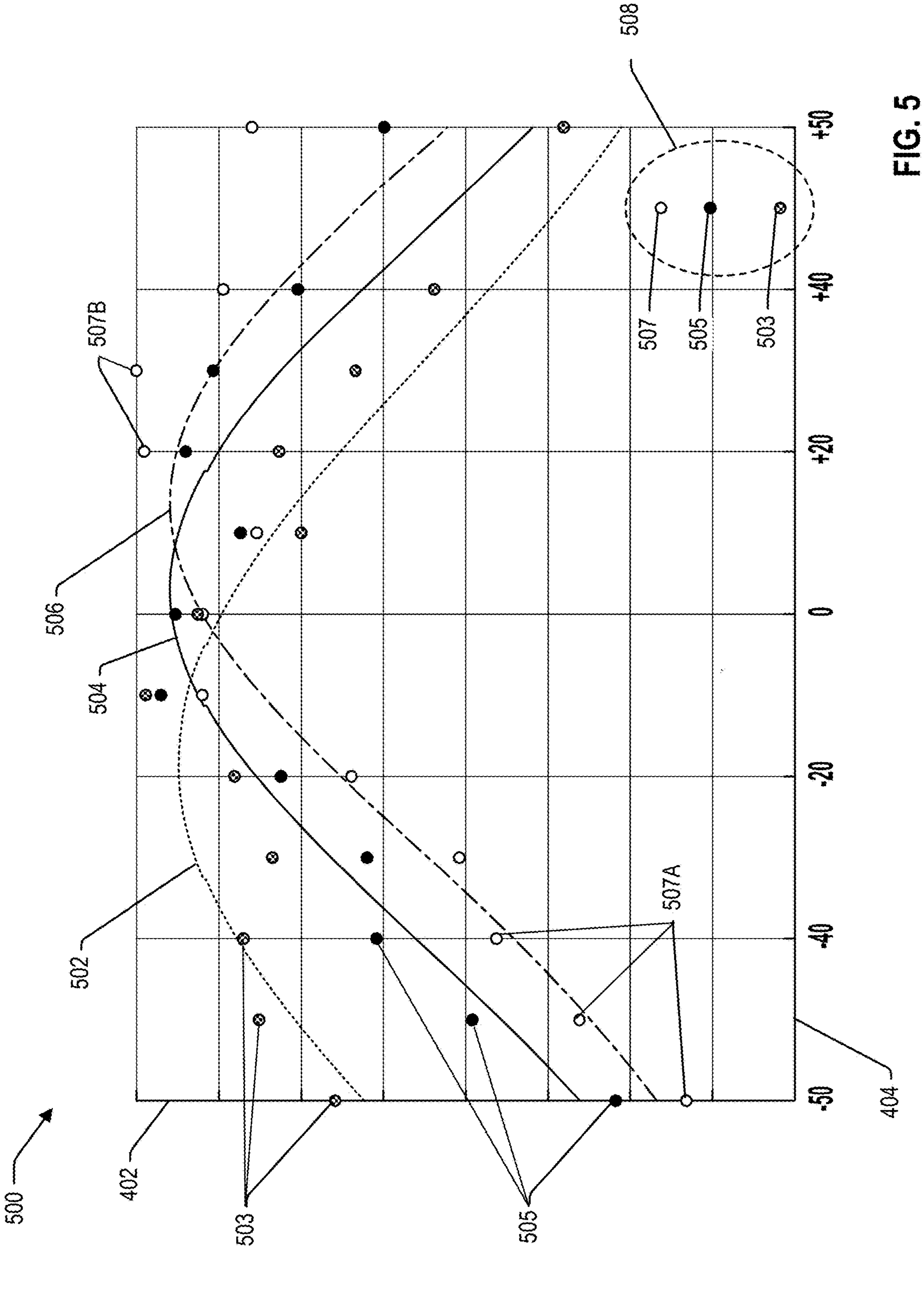
FIG. 5 illustrates another example diagram of a relationship between respective magnitudes of currents associated with sensor signals to generate an angle-of-attack parameter value, in accordance with some examples of the subject disclosure.

FIG. 5 illustrates another example diagram 500 of a relationship between respective magnitudes of currents associated with sensor signals (e.g., the sensor signals of FIG. 1, the sensor signals 881 of FIG. 8, or some combination thereof) to generate an angle-of-attack parameter value, in accordance with some examples of the subject disclosure. In some aspects, the angle of attack of an aircraft (e.g., the aircraft 200 of FIG. 2) is indicated by the angle-of-attack parameter value.

The example diagram 500 illustrates a plurality of data points plotted along the first axis 404 and the second axis 402 of FIG. 4. In some implementations, the diagram 500 includes a first set 503 of data points, a second set 505 of data points, and a third set 507 of data points. Each of the sets 503, 505, 507 can include a plurality of data points, each data point corresponding to a respective collector electrode of the exemplary array of collector electrodes 104 of FIG. 1 at a particular point in time, as described in more detail above with reference to FIG. 4. In the example diagram 500, each of the sets 503, 505, 507 has been analyzed to identify a statistical fit. For example, the first set 503 has a corresponding first fit 502, the second set 505 has a corresponding second fit 504, and the third set 507 has a corresponding third fit 506. As noted above with reference to FIG. 4, one or more processors can be configured to identify a peak value of each fit 502, 504, 506 to identify the fluid airflow direction parameter value for the particular point in time associated with the particular fit 502, 504, 506.

In some aspects, the diagram 500 illustrates a set 508 of anomalous data points. In the example of FIG. 5, the set 508 includes a data point from each of the sets 503, 505, 507. In a particular configuration, the processor(s) can be configured to identify the anomalous data point(s), the particular collector electrode associated with the anomalous data point(s), identify the particular collector electrode as providing anomalous readings, or some combination thereof. For example, the processor(s) can be configured to identify anomalous data point(s) by identifying one or more data points that lie outside a statistical fit threshold from the identified statistical fit. In such a manner, the sensor providing the data points for the sets 503, 505, 507 can be configured to generate self-diagnosis information.

The diagram 500 illustrates the use of sensor signal data to generate the fluid airflow direction parameter value. For example, a particular data set can include data points associated with the current in the array of collector electrodes, but the statistical fit associated with the particular data set can provide a better measurement for the fluid airflow direction parameter value. The third set 507 of data points, for instance, includes a plurality of data points 507A with magnitudes less than a peak of the second fit 506 and a plurality of data points 507B with magnitudes greater than the peak of the second fit 506. Analysis of the relationship between respective magnitudes of the currents can provide a better measurement of the fluid airflow direction parameter value.

Additionally, each of the fits 502, 504, 506 is associated with a particular point in time. In a particular aspect, the points of time associated with each of the fits 502, 504, 506 can be sufficiently close together that the fits 502, 504, 506 can be analyzed collectively to provide a more accurate measurement of the fluid airflow direction parameter value. For example, a current peak associated with each of the fits 502, 504, 506 can be averaged to provide an overall current peak value.

Although the diagram 500 illustrates certain data points and statistical analyses of those data points, more, fewer, and/or different data points, analyses, etc. can be present without departing from the scope of the subject disclosure. For example, a given system may not generate anomalous data points, may have a different number of collector electrodes (and a correspondingly different number of data points associated with the relative magnitudes of the currents), etc.

Figure 6:
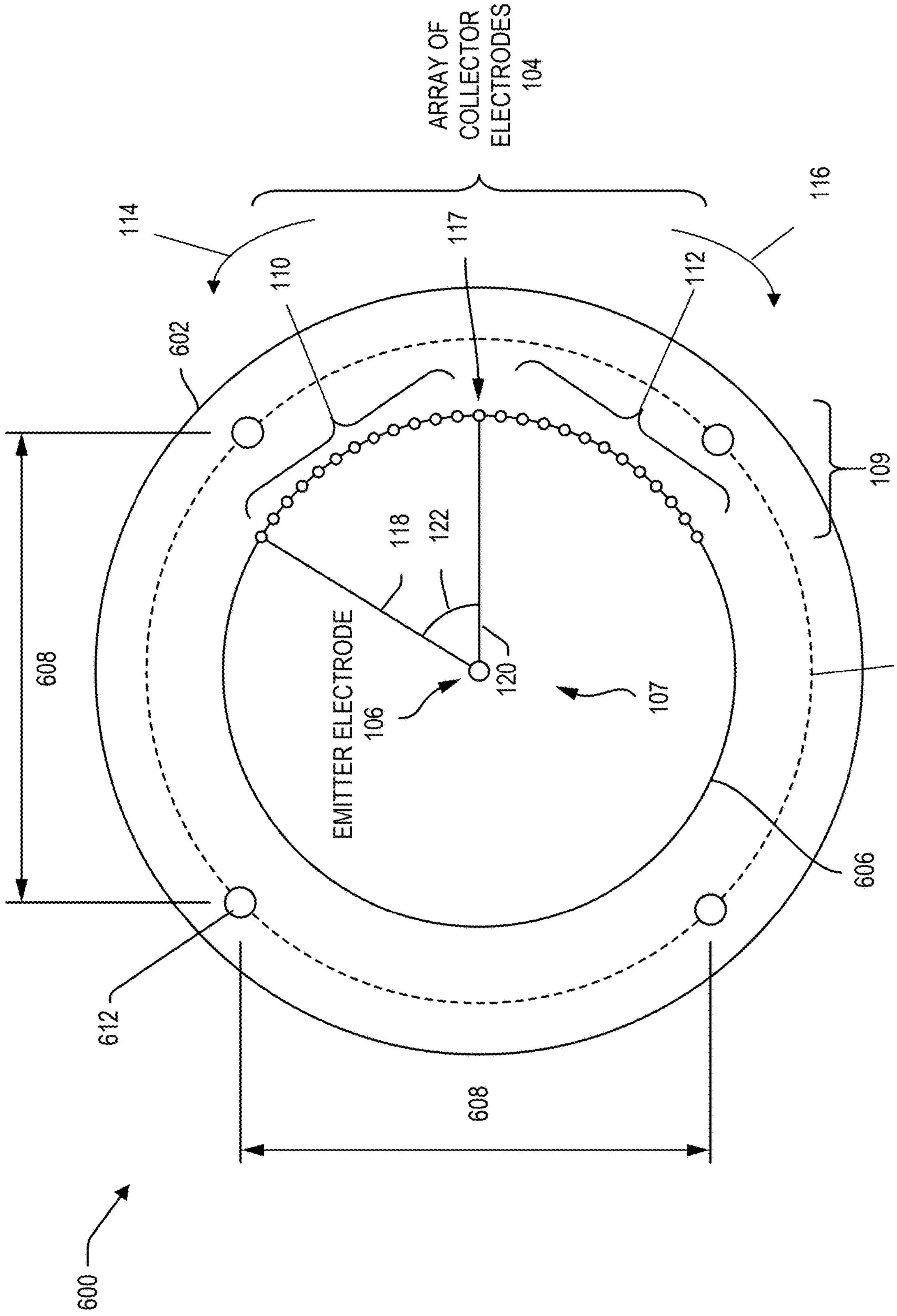
FIG. 6 illustrates an example sensor for detecting an angle of an airflow, in accordance with some examples of the subject disclosure.

FIG. 6 illustrates an example sensor 600 for detecting an angle of an airflow, in accordance with some examples of the subject disclosure. Generally, the sensor 600 corresponds to the sensor 102 of FIG. 1, the sensor 204 of FIG. 2, or some combination thereof. In some implementations, the sensor 600 includes the emitter electrode 106 disposed at the first position 107 and configured to be exposed to the fluid airflow 108 of FIG. 1. The sensor 600 also includes the array of collector electrodes 104 disposed at the second position 109. The array of collector electrodes includes the first collector electrode 117 aligned with the emitter electrode 106 at a reference position, the first set 110 of collector electrodes angularly offset from the first collector electrode in the first direction 114, and the second set 112 of collector electrodes angularly offset from the first collector electrode in the second direction 116.

The sensor 600 includes twenty-five collector electrodes in the array of collector electrodes 104, with twelve electrodes each in the first set 110 and the second set 112 of collector electrodes angularly offset from the first collector electrode 117. The twelve collector electrodes in each set 110, 112 are spaced substantially equidistant from the emitter electrode 106 at approximately five-degree intervals from one another. The configuration illustrated in the sensor 600 enables measurements of an airflow direction parameter value for a range of interest (e.g., the first range of interest, the second range of interest, or a combination thereof of FIG. 1) of approximately sixty degrees. The configuration illustrates the first set 110 of collector electrodes aligned from the axis 118 to the axis 120. The angle 122 is approximately sixty degrees.

In some implementations, the sensor 600 is a solid-state, angle-of-attack sensor. The sensor 600 includes a plurality of coupling points 612 disposed between an outer circumference 602 of the sensor 600 and an inner circumference 606 of the sensor 600. The inner circumference 606 can generally be associated with the angular offset of the sets 110, 112 of the collector electrodes. A middle circumference 604 identifies exemplary positions of exemplary coupling points 612. In the example of FIG. 6, a distance 608 between pairs of coupling points 612 and other dimensions of the sensor 600 are selected to enable mounting of the sensor 600 in place of a conventional angle-of-attack sensor. For example, for use on Boeing® commercial aircraft, the distance 608 between pairs of coupling points 612 is approximately 2.859 inches, the inner circumference 606 is approximately 3.25 inches, the middle circumference 604 is approximately 4.185 inches, and the outer circumference 602 is approximately 4.87 inches (Boeing® is a registered trademark of The Boeing Company, a Delaware corporation).

In some implementations, a surface including the sensor 600 can be substantially planar and raised from a mounting surface sufficient to extend above the boundary layer associated with the relative movement of the fluid airflow. For example, the surface could extend approximately 0.125 inches above the exterior skin of an aircraft (e.g., the aircraft 200 of FIG. 2).

Figure 7:
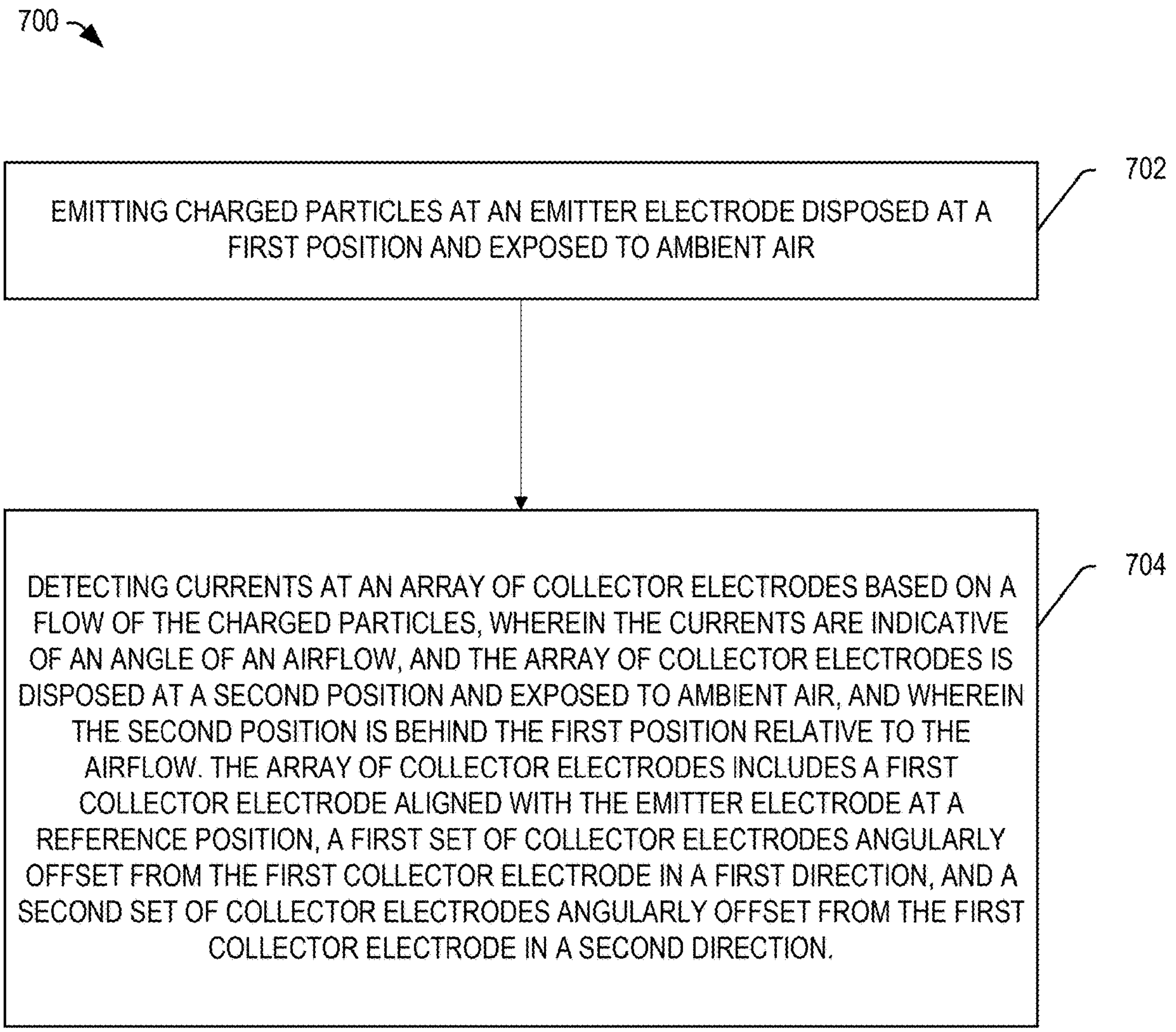
FIG. 7 is a flow chart of an example method for detecting an angle of an airflow, in accordance with some examples of the subject disclosure.

FIG. 7 is a flow chart of an example method 700 for detecting an angle of an airflow, in accordance with some examples of the subject disclosure. The method 700 can be initiated, performed, or controlled by one or more processors executing instructions, such as by the processor(s) 820 of FIG. 8 executing instructions 834 from the memory 830. The method 700 can also be initiated, performed, or controlled by the sensor 102 of FIG. 1, the sensor 204 of FIG. 2, the system 300 of FIG. 3, the sensor 600 of FIG. 6, or some combination thereof.

In some implementations, the method 700 includes, at block 702, emitting charged particles at an emitter electrode disposed at a first position and exposed to ambient air. For example, the sensor 102 of FIG. 1 can be configured to emit charged particles at the emitter electrode 106 disposed at the first position 107 and exposed to the fluid airflow 108.

The method 700 includes, at block 704, detecting currents at an array of collector electrodes based on a flow of the charged particles, wherein the currents are indicative of an angle of an airflow, and the array of collector electrodes is disposed at a second position and exposed to ambient air, and wherein the second position is behind the first position relative to the airflow. The array of collector electrodes includes a first collector electrode aligned with the emitter electrode at a reference position, a first set of collector electrodes angularly offset from the first collector electrode in a first direction, and a second set of collector electrodes angularly offset from the first collector electrode in a second direction. For example, the sensor 102 of FIG. 1 can be configured to detect currents at the array of collector electrodes 104 based on the flow of charged particles. The currents are indicative of an angle of the fluid airflow 108. The array of collector electrodes 104 is disposed at the second position 109 and exposed to the fluid airflow 108, and the second position 109 is behind the first position 107 relative to the fluid airflow 108. The array of collector electrodes 104 includes the first collector electrode 117 aligned with the emitter electrode 106 at a reference position (e.g., along the axis 120). The first set 110 of collector electrodes is angularly offset from the first collector electrode 117 in the first direction 114. The second set 112 of collector electrodes is angularly offset from the first collector electrode 117 in the second direction 116.

In some implementations, the method 700 can include more, fewer, and/or different steps without departing from the scope of the subject disclosure. For example, the method 700 can also include receiving sensor signals from an array of current sensors coupled to a respective collector electrode of the array of collector electrodes. The method 700 can also include generating an angular direction parameter value based at least in part on a relationship between respective magnitudes of the currents associated with the sensor signals.

Further, the methods described above with reference to FIG. 7 can be implemented to realize one or more of the technical advantages described in more detail above. For example, the method 700 can enable a more reliable and maintainable angle-of-attack sensor.

FIG. 8 is a block diagram of a computing environment 800 including a computing device 810 configured to support aspects of computer-implemented methods and computer-executable program instructions (or code), in accordance with some examples of the subject disclosure. For example, the computing device 810, or portions thereof, is configured to execute instructions to initiate, perform, or control one or more operations described in more detail above with reference to FIGS. 1-7. In a particular aspect, the computing device 810 can include, correspond to, or be included within a computing device, one or more servers, one or more virtual devices, or a combination thereof.

The computing device 810 includes one or more processors 820. The processor(s) 820 are configured to communicate with system memory 830, one or more storage devices 850, one or more input/output interfaces 840, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which can include a basic input/output system for booting the computing device 810 as well as a full operating system to enable the computing device 810 to interact with users, other programs, and other devices. The system memory 830 stores system (program) data 838, such as the respective magnitudes 839 of currents from sensor signals 881.

The system memory 830 includes one or more applications 834 (e.g., sets of instructions) executable by the processor(s) 820, such as an angular direction parameter calculator 837. As an example, the one or more applications 834 include the instructions 836 executable by the processor(s) 820 to initiate, control, or perform one or more operations described with reference to FIGS. 1-7. To illustrate, the one or more applications 834 include the instructions 836 executable by the processor(s) 820 to initiate, control, or perform one or more operations described with reference to receiving the sensor signals 881 from the array of current sensors of FIG. 1, and computing an angular direction parameter value based at least in part on a relationship between the respective magnitudes 839 of the currents associated with the sensor signals 881.

In a particular implementation, the system memory 830 includes a non-transitory, computer readable medium (e.g., a computer-readable storage device) storing the instructions 836 that, when executed by the processor(s) 820, cause the processor(s) 820 to initiate, perform, or control operations for detecting an angle of an airflow. The operations include receiving the sensor signals from the array of current sensors and computing an angular direction parameter value based at least in part on a relationship between the respective magnitudes of the currents associated with the sensor signals.

In the same or alternative particular implementations, the system memory 830 includes a non-transitory, computer readable medium (e.g., a computer-readable storage device) storing the instructions 836 that, when executed by the processor(s) 820, cause the processor(s) 820 to initiate, perform, or control operations for detecting an angle of an airflow. The operations include receiving the sensor signals from the array of current sensors, and computing an angular direction parameter value based at least in part on a relationship between the respective magnitudes of the currents associated with the sensor signals.

The one or more storage devices 850 include nonvolatile storage devices, such as magnetic disks, optical disks, or flash memory devices. In a particular example, the storage devices 850 include both removable and non-removable memory devices. The storage devices 850 are configured to store an operating system, images of operating systems, applications (e.g., one or more of the applications 834), and program data (e.g., the program data 838). In a particular aspect, the system memory 830, the storage devices 850, or both, include tangible computer-readable media. In a particular aspect, one or more of the storage devices 850 are external to the computing device 810.

The one or more input/output interfaces 840 enable the computing device 810 to communicate with one or more input/output devices 870 to facilitate user interaction. For example, the one or more input/output interfaces 840 can include a display interface, an input interface, or both. For example, the input/output interface 840 is adapted to receive input from a user, to receive input from another computing device, or a combination thereof. In some implementations, the input/output interface 840 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 870 includes one or more user interface devices and displays, including some combination of buttons, keyboards, pointing devices, displays, speakers, microphones, touch screens, and other devices.

The processor(s) 820 are configured to communicate with devices or controllers 880 via the one or more communications interfaces 860. For example, the one or more communications interfaces 860 can include a network interface. The devices or controllers 880 can include, for example, the sensor(s) 102 of FIG. 1, the sensor 204 of FIG. 2, the system 300 of FIG. 3, the sensor 600 of FIG. 6, or some combination thereof. In some implementations, the devices or controllers 880 can include a direct-current ("DC"), high-voltage power source 825, and array of current sensors 815, or a combination thereof. For example, as described in more detail above with reference to FIG. 1, the sensor 102 configured as a solid-state, angle-of-attack sensor can include the DC high-voltage power source 825. As another example, the sensor 102 can include the array of current sensors 815, where each sensor of the array of current sensors is coupled to a respective collector electrode of the array of collector electrodes 104 of FIG. 1 and is configured to output the sensor signals 881.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-7. In some implementations, part or all of one or more of the operations or methods of FIGS. 1-7 can be implemented by one or more processors (e.g., one or more central processing units (CPUs), one or more graphics processing units (GPUs), one or more digital signal processors (DSPs)) executing instructions, by dedicated hardware circuitry, or any combination thereof.

Figure 9:
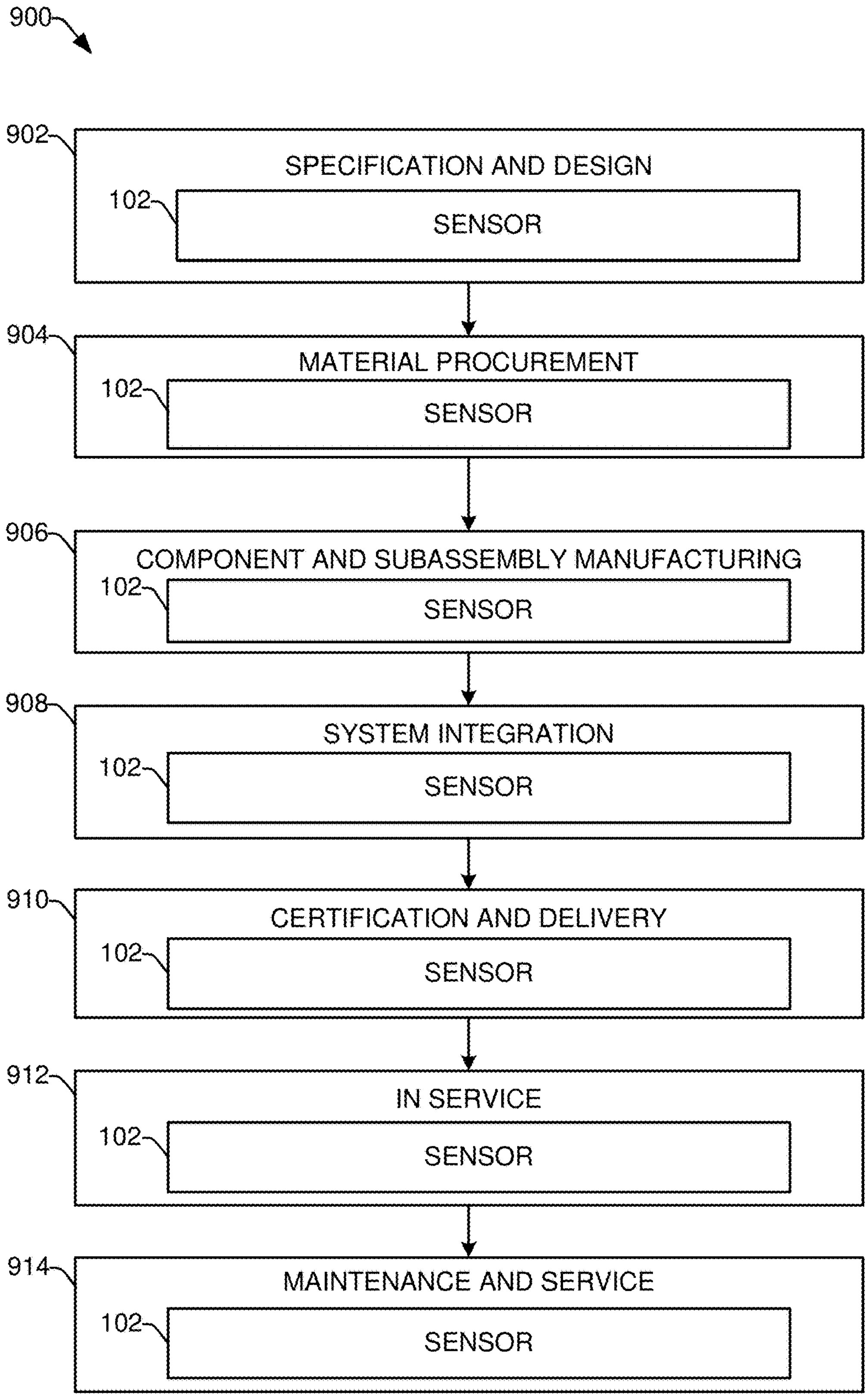
FIG. 9 is a flowchart of an example method illustrating a life cycle of an aircraft that includes a sensor for detecting an angle of an airflow, in accordance with some examples of the subject disclosure.

FIG. 9 is a flowchart of an example method 900 illustrating a life cycle of an aircraft that includes a sensor for detecting an angle of an airflow, in accordance with some examples of the subject disclosure. During pre-production, the method 900 includes, at 902, specification and design of an aircraft, such as the portion of the aircraft 200 described with reference to FIG. 2. During specification and design of the aircraft, the method 900 may include specification and design of the sensor 102. At 904, the method 900 includes material procurement, which may include procuring materials for the sensor 102.

During production, the method 900 includes, at 906, component and subassembly manufacturing and, at 908, system integration of the aircraft. For example, the method 900 may include component and subassembly manufacturing of the sensor 102 and system integration of the sensor 102. At 910, the method 900 includes certification and delivery of the aircraft and, at 912, placing the aircraft in service. Certification and delivery may include certification of the sensor 102 to place the sensor 102 in service. While in service by a customer, the aircraft may be scheduled for routine maintenance and service (which may also include modification, reconfiguration, refurbishment, and so on). At 914, the method 900 includes performing maintenance and service on the aircraft, which may include performing maintenance and service on the sensor 102.

Each of the processes of the method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 10:
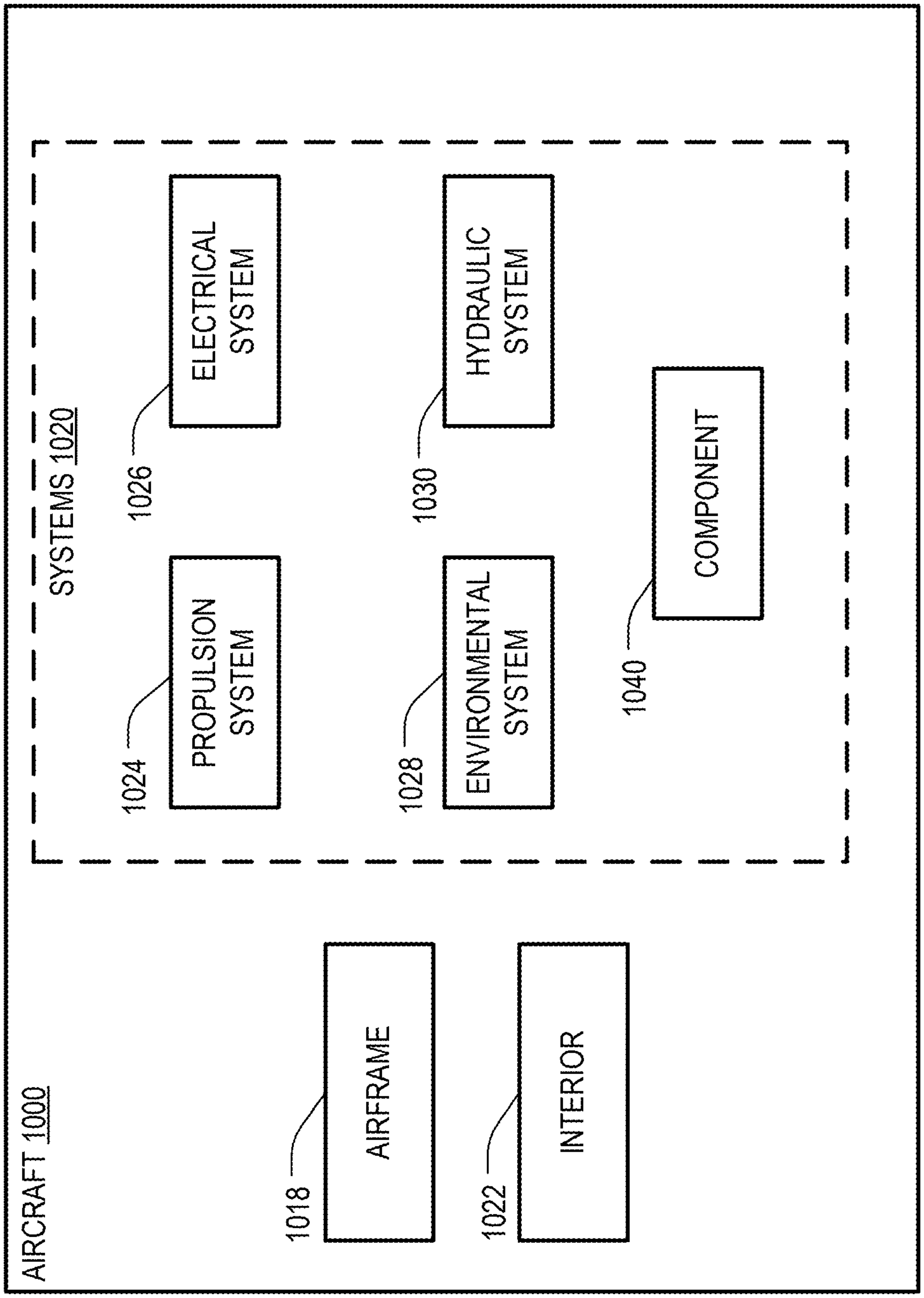
FIG. 10 illustrates an example aircraft that includes a component for detecting an angle of an airflow, in accordance with some examples of the subject disclosure.

FIG. 10 illustrates an example aircraft 1000 that includes a component 1040 for detecting an angle of an airflow, in accordance with some examples of the subject disclosure (e.g., using the method 700 of FIG. 7). In the example of FIG. 10, the aircraft 1000 includes an airframe 1018 with a plurality of systems 1020 and an interior 1022. Examples of the plurality of systems 1020 include one or more of a propulsion system 1024, an electrical system 1026, an environmental system 1028, and a hydraulic system 1030. Any number of other systems may be included.

In the example of FIG. 10, the component 1040 includes the sensor 102 of FIG. 1, the sensor 204 of FIG. 2, the sensor 600 of FIG. 6, or a combination thereof. In some implementations, the component 1040 is configured to perform certain operations, such as those described above with reference to the method 700 of FIG. 7.

To illustrate, in some examples, the component 1040 is included in the airframe 1018. In one example, the component 1040 includes or corresponds to an exterior component of the aircraft 1000, such as a skin portion of the aircraft 1000. Alternatively or in addition, in other examples, the component 1040 includes or corresponds to another component of the aircraft 1000, such as component of the interior 1022 that includes the sensor 102, the sensor 204, the sensor 600, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

According to Example 1, an aircraft includes an exterior skin. The aircraft also includes an emitter electrode disposed at a first position in proximity to the exterior skin and exposed to ambient air. The emitter electrode is configured to generate charged particles proximate the emitter electrode. The aircraft also includes an array of collector electrodes disposed at a second position in proximity to the exterior skin and exposed to ambient air. The second position is aft of the first position. Each collector electrode of the array of collector electrodes is configured to detect a current associated with a flow of the charged particles during movement of the aircraft through an atmosphere. The array of collector electrodes includes a first collector electrode aligned with the emitter electrode at a reference position, a first set of collector electrodes angularly offset from the first collector electrode in a first direction, and a second set of collector electrodes angularly offset from the first collector electrode in a second direction. Outputs from the array of collector electrodes are indicative of an angle of attack of the aircraft.

Example 2 includes the aircraft of Example 1, further comprising an array of current sensors, wherein each sensor of the array of current sensors is coupled to a respective collector electrode of the array of collector electrodes and is configured to output a sensor signal.

Example 3 includes the aircraft of Example 2, further comprising a processor connected to receive the sensor signals from the array of current sensors and configured to compute an angle-of-attack parameter value based at least in part on a relationship between respective magnitudes of the currents associated with the sensor signals, wherein the angle of attack of the aircraft is indicated by the angle-of-attack parameter value.

Example 4 includes the aircraft of Example 3, wherein the processor is configured to compute the angle-of-attack parameter value based at least on a current peak at the array of collector electrodes.

Example 5 includes the aircraft of any of Examples 1 to 4, wherein said movement of the aircraft through the atmosphere includes a lateral axis motion of the aircraft and a chord line of an airfoil relative to airflow as the airfoil moves through the atmosphere, wherein the lateral movement causes a change of the angle of attack of the aircraft; the reference position includes a zero-angle reference position; the first direction includes a positive angle direction; and the second direction includes a negative angle direction.

Example 6 includes the aircraft of any of Examples 1 to 5, wherein the emitter electrode is configured to provide an electrical potential between the emitter electrode and the array of collector electrodes.

Example 7 includes the aircraft of any of Examples 1 to 6, wherein the first position includes a position elevated from the exterior skin and extending above a boundary layer associated with the ambient air during movement of the aircraft through the atmosphere.

Example 8 includes the aircraft of any of Examples 1 to 7, wherein the emitter electrode is shaped to define an apex to concentrate electrical field ionization.

Example 9 includes the aircraft of any of Examples 1 to 8, wherein at least one collector electrode of the array of collector electrodes has a blunted shape.

Example 10 includes the aircraft of any of Examples 1 to 9, wherein the first set of collector electrodes includes a first plurality of electrodes arranged angularly along the first direction and angularly offset from one another across a first range of interest associated with a positive angle of attack measurement for the aircraft.

Example 11 includes the aircraft of Example 10, wherein the first plurality of electrodes are disposed at substantially equal angular intervals across the first range of interest.

Example 12 includes the aircraft of any of Examples 10 to 11, wherein the first plurality of electrodes are positioned equidistant from the emitter electrode.

Example 13 includes the aircraft of any of Examples 10 to 12, wherein the first set of electrodes includes twelve electrodes.

Example 14 includes the aircraft of Example 13, wherein the first plurality of electrodes are spaced at approximately five-degree intervals.

Example 15 includes the aircraft of any of Examples 10 to 14, wherein the first range of interest includes an arc of approximately thirty degrees relative to the first collector electrode along the first direction.

Example 16 includes the aircraft of any of Examples 1 to 15, wherein the second set of collector electrodes includes a second plurality of electrodes arranged angularly along the second direction and angularly offset from one another across a second range of interest associated with a negative angle of attack measurement for the aircraft.

Example 17 includes the aircraft of Example 16, wherein the second plurality of electrodes are disposed at substantially equal angular intervals across the second range of interest.

Example 18 includes the aircraft of Example 16 or Example 17, wherein the second plurality of electrodes are positioned equidistant from the emitter electrode.

Example 19 includes the aircraft of any of Examples 16 to 18, wherein the second set of electrodes includes twelve electrodes.

Example 20 includes the aircraft of Example 19, wherein the second plurality of electrodes are spaced at approximately five-degree intervals.

Example 21 includes the aircraft of any of Examples 16 to 20, wherein the second range of interest includes an arc of approximately thirty degrees relative to the first collector electrode along the second direction.

Example 22 includes the aircraft of any of Examples 1 to 21, wherein the second position is sufficiently spaced relative to the first position to substantially prevent arcing between the emitter electrode and the array of collector electrodes.

Example 23 includes the aircraft of any of Examples 1 to 22 and further includes a solid-state, angle-of-attack sensor that includes the emitter electrode, the array of collector electrodes, and a direct-current, high-voltage power source.

According to Example 24, a sensor includes an emitter electrode configured to be disposed at a first position and exposed to a fluid airflow. The emitter electrode is configured to generate charged particles proximate the emitter electrode. The sensor also includes an array of collector electrodes configured to be disposed at a second position and exposed to the fluid airflow. The second position is offset from the first position. Each collector electrode of the array of collector electrodes is configured to detect a current associated with an electric field of the charged particles during relative movement of the fluid airflow. The array of collector electrodes includes a first collector electrode aligned with the emitter electrode at a reference position, a first set of collector electrodes angularly offset from the first collector electrode in a first direction, and a second set of collector electrodes angularly offset from the first collector electrode in a second direction. Outputs from the array of collector electrodes are indicative of an angular direction of the relative movement of the fluid airflow.

Example 25 includes the sensor of Example 24, further comprising an array of current sensors, wherein each sensor of the array of current sensors is coupled to a respective collector electrode of the array of collector electrodes and is configured to output a sensor signal.

Example 26 includes the sensor of Example 25, further comprising a processor connected to receive the sensor signals from the array of current sensors and configured to compute an angular direction parameter value based at least in part on a relationship between respective magnitudes of the currents associated with the sensor signals, wherein the direction of the relative movement of the fluid airflow is indicated by the angular direction parameter value.

Example 27 includes the sensor of Example 26, wherein the processor is configured to compute the angular direction parameter value based at least on a current peak at the array of collector electrodes.

Example 28 includes the sensor of any of Examples 24 to 27, wherein the emitter electrode is configured to provide an electrical potential between the emitter electrode and the array of collector electrodes.

Example 29 includes the sensor of any of Examples 24 to 28, wherein the first position includes a position extending above a boundary layer associated with the relative movement of the fluid airflow.

Example 30 includes the sensor of any of Examples 24 to 29, wherein the emitter electrode is shaped to define an apex to concentrate electrical field ionization.

Example 31 includes the sensor of any of Examples 24 to 30, wherein at least one collector electrode of the array of collector electrodes has a blunted shape.

Example 32 includes the sensor of any of Examples 24 to 31, wherein the first set of collector electrodes includes a first plurality of electrodes arranged angularly along the first direction and angularly offset from one another across a first range of interest associated with a first angle of the relative movement of the fluid airflow.

Example 33 includes the sensor of Example 32, wherein the first plurality of electrodes are disposed at substantially equal angular intervals across the first range of interest.

Example 34 includes the sensor of Example 32 or Example 33, wherein the first plurality of electrodes are positioned equidistant from the emitter electrode.

Example 35 includes the sensor of any of Examples 32 to 34, wherein the first set of electrodes includes twelve electrodes.

Example 36 includes the sensor of Example 35, wherein the first plurality of electrodes are spaced at approximately five-degree intervals.

Example 37 includes the sensor of any of Examples 32 to 36, wherein the first range of interest includes an arc of approximately thirty degrees relative to the first collector electrode along the first direction.

Example 38 includes the sensor of any of Examples 24 to 37, wherein the second set of collector electrodes includes a second plurality of electrodes arranged angularly along the second direction and angularly offset from one another across a second range of interest associated with a second angle of the relative movement of the fluid airflow.

Example 39 includes the sensor of Example 38, wherein the second plurality of electrodes are disposed at substantially equal angular intervals across the second range of interest.

Example 40 includes the sensor of Example 38 or Example 39, wherein the second plurality of electrodes are positioned equidistant from the emitter electrode.

Example 41 includes the sensor of any of Examples 38 to 40, wherein the second set of electrodes includes twelve electrodes.

Example 42 includes the sensor of Example 41, wherein the second plurality of electrodes are spaced at approximately five-degree intervals.

Example 43 includes the sensor of any of Examples 38 to 42, wherein the second range of interest includes an arc of approximately thirty degrees relative to the first collector electrode along the second direction.

Example 44 includes the sensor of any of Examples 24 to 43, wherein the second position is sufficiently spaced relative to the first position to substantially prevent arcing between the emitter electrode and the array of collector electrodes.

Example 45 includes the sensor of any of Examples 24 to 44, wherein the sensor is a solid-state sensor that includes the emitter electrode, the array of collector electrodes, and a direct-current, high-voltage power source.

Example 46 includes the sensor of any of Examples 24 to 45, wherein the relative movement of the fluid airflow includes operation of the sensor in an atmosphere.

Example 47 includes the sensor of Example 46, wherein the angular direction of the relative movement of the fluid airflow includes an angular measurement output of the sensor.

Example 48 includes the sensor of Example 47, wherein the reference position includes a zero-angle reference position, the first direction includes a positive angle direction, and the second direction includes a negative angle direction.

Example 49 includes the sensor of Example 47 or Example 48, wherein the first set of collector electrodes includes a first plurality of electrodes arranged angularly along the first direction and angularly offset from one another across a first range of interest associated with a positive angular measurement output of the sensor.

Example 50 includes the sensor of Example 48 or Example 49, wherein the second set of collector electrodes includes a second plurality of electrodes arranged angularly along the second direction and angularly offset from one another across a second range of interest associated with a negative angular measurement output of the sensor.

According to Example 51, a method includes emitting charged particles at an emitter electrode disposed at a first position and exposed to ambient air. The method also includes detecting currents at an array of collector electrodes based on a flow of the charged particles. The currents are indicative of an angle of an airflow. The array of collector electrodes is disposed at a second position and exposed to ambient air. The second position is behind the first position relative to the airflow. The array of collector electrodes includes a first collector electrode aligned with the emitter electrode at a reference position, a first set of collector electrodes angularly offset from the first collector electrode in a first direction, and a second set of collector electrodes angularly offset from the first collector electrode in a second direction.

What is claimed is:

1. An aircraft comprising:

an exterior skin;

an emitter electrode disposed at a first position in proximity to the exterior skin and exposed to ambient air, wherein the emitter electrode is configured to generate charged particles proximate the emitter electrode;

an array of collector electrodes disposed at a second position in proximity to the exterior skin and exposed to ambient air, wherein the second position is aft of the first position, and wherein:

each collector electrode of the array of collector electrodes is configured to detect a current associated with a flow of the charged particles during movement of the aircraft through an atmosphere; and the array of collector electrodes comprises:

a first collector electrode aligned with the emitter electrode at a reference position;

a first set of collector electrodes angularly offset from the first collector electrode in a first direction; and a second set of collector electrodes angularly offset from the first collector electrode in a second direction;

wherein outputs from the array of collector electrodes are indicative of an angle of attack of the aircraft; and a processor configured to:

identify a peak current;

determine a collector electrode, of the array of collector electrodes, that is associated with the peak current; and determine the angle of attack based on an angle value associated with the collector electrode that is associated with the peak current.

2. The aircraft of claim 1, further comprising an array of current sensors, wherein each sensor of the array of current sensors is coupled to a respective collector electrode of the array of collector electrodes and is configured to output a sensor signal.

3. The aircraft of claim 2, wherein the processor is connected to receive sensor signals from the array of current sensors.

4. The aircraft of claim 3, wherein the processor is further configured to plot data points along a first axis and a second axis to generate a statistical fit, and wherein the first axis represents angle values and the second axis represents current values.

5. The aircraft of claim 1, wherein:

the movement of the aircraft through the atmosphere comprises a lateral axis motion of the aircraft and a chord line of an airfoil relative to airflow as the airfoil moves through the atmosphere, wherein lateral movement of the aircraft causes a change of the angle of attack of the aircraft;

the reference position comprises a zero-angle reference position;

the first direction comprises a positive-angle direction; and the second direction comprises a negative-angle direction.

6. The aircraft of claim 1, wherein the emitter electrode is configured to provide an electrical potential between the emitter electrode and the array of collector electrodes.

7. The aircraft of claim 1, wherein the first position comprises a position elevated from the exterior skin and extending above a boundary layer associated with the ambient air during the movement of the aircraft through the atmosphere.

8. The aircraft of claim 1, wherein the emitter electrode is shaped to define an apex to concentrate electrical field ionization.

9. The aircraft of claim 1, wherein at least one collector electrode of the array of collector electrodes has a blunted shape.

10. The aircraft of claim 1, wherein the first set of collector electrodes comprises a first plurality of electrodes arranged angularly along the first direction and angularly offset from one another across a first range of interest associated with a positive angle-of-attack measurement for the aircraft.

11. The aircraft of claim 10, wherein the first plurality of electrodes are disposed at substantially equal angular intervals across the first range of interest.

12. The aircraft of claim 10, wherein the first plurality of electrodes are positioned equidistant from the emitter electrode.

13. The aircraft of claim 10, wherein the first set of electrodes comprises twelve electrodes.

14. The aircraft of claim 13, wherein the first plurality of electrodes are spaced at approximately five-degree intervals.

15. A sensor system comprising:

an emitter electrode configured to be disposed at a first position and exposed to a fluid airflow, wherein the emitter electrode is configured to generate charged particles proximate the emitter electrode;

an array of collector electrodes configured to be disposed at a second position and exposed to the fluid airflow, wherein the second position is offset from the first position, and wherein:

each collector electrode of the array of collector electrodes is configured to detect a current associated with an electric field of the charged particles during relative movement of the fluid airflow, wherein the array of collector electrodes comprises:

a first collector electrode aligned with the emitter electrode at a reference position;

a first set of collector electrodes angularly offset from the first collector electrode in a first direction; and a second set of collector electrodes angularly offset from the first collector electrode in a second direction, wherein outputs from the array of collector electrodes are indicative of an angular direction of the relative movement of the fluid airflow; and a processor configured to:

identify a peak current;

determine a collector electrode, of the array of collector electrodes, that is associated with the peak current; and determine an angle of attack based on an angle value associated with the collector electrode that is associated with the peak current.

16. The sensor system of claim 15, further comprising an array of current sensors, wherein each sensor of the array of current sensors is coupled to a respective collector electrode of the array of collector electrodes and is configured to output a sensor signal.

17. The sensor system of claim 16, further comprising a processor connected to receive sensor signals from the array of current sensors.

18. The sensor system of claim 15, wherein the sensor system comprises a solid-state sensor that includes the emitter electrode, the array of collector electrodes, and a direct-current, high-voltage power source.

19. The sensor system of claim 15, wherein the first position comprises a position extending above a boundary layer associated with the relative movement of the fluid airflow.

20. A method comprising:

emitting charged particles at an emitter electrode disposed at a first position and exposed to ambient air; and detecting currents at an array of collector electrodes based on a flow of the charged particles, wherein:

the currents are indicative of an angle of an airflow; and the array of collector electrodes is disposed at a second position and exposed to ambient air, wherein the second position is behind the first position relative to the airflow, and wherein the array of collector electrodes comprises:

a first collector electrode aligned with the emitter electrode at a reference position;

a first set of collector electrodes angularly offset from the first collector electrode in a first direction; and a second set of collector electrodes angularly offset from the first collector electrode in a second direction;

identifying, at a processor, a peak current;

determining, at the processor, a collector electrode, of the array of collector electrodes, that is associated with the peak current; and determining, at the processor, the angle of attack based on an angle value associated with the collector electrode that is associated with the peak current.

* * * * *